United States Patent [19]

Knapp

[11] Patent Number: 4,942,902
[45] Date of Patent: Jul. 24, 1990

[54] MIXING CARTRIDGE FAUCET WITH PARTS THAT CAN APPLY PRESSURE TO THE VALVE PLATES OF HARD MATERIAL

[75] Inventor: Alfons Knapp, Biberach/Riss, Fed. Rep. of Germany

[73] Assignee: Masco Corporation, Taylor, Mich.

[21] Appl. No.: 369,561

[22] PCT Filed: Sep. 8, 1988

[86] PCT No.: PCT/US88/03087
§ 371 Date: May 5, 1989
§ 102(e) Date: May 5, 1989

[87] PCT Pub. No.: WO89/02558
PCT Pub. Date: Mar. 23, 1989

[30] Foreign Application Priority Data

Sep. 9, 1987 [IT] Italy ................... 67768 A/87
Sep. 9, 1987 [IT] Italy ................... 67769 A/87
Sep. 9, 1987 [IT] Italy ................... 67770 A/87

[51] Int. Cl.⁵ ............................................. F16K 11/06
[52] U.S. Cl. .............................. 137/625.17; 137/270;
137/454.6; 137/625.4; 251/172; 251/361; 251/363
[58] Field of Search ............ 137/270, 454.6, 625.17,
137/625.4; 251/172, 360, 361, 363, 368

[56] References Cited

U.S. PATENT DOCUMENTS 4,250,912 2/1981 Knapp ..................... 137/454.6 X
4,610,268 9/1986 Knapp ..................... 137/454.6
4,676,270 6/1987 Knapp et al. ............. 137/625.4
4,754,783 7/1988 Knapp ..................... 137/625.4
4,804,011 2/1989 Knapp ..................... 137/270

Primary Examiner—John Rivell
Attorney, Agent, or Firm—Edgar A. Zarins; Malcolm L. Sutherland

[57] ABSTRACT

A mixing faucet for hot and cold water including a cartridge 40 which contains a fixed valve plate 32 and a movable valve plate 23, both constructed of hard ceramic material, and both constructed to control the proportion of mixing and the flow that comes out of the faucet. In this faucet, the part 25 of the cartridge that has the seat for the fixed valve plate 32 constitutes an element which is separate from the cover 16 of the cartridge. It is mounted in the cover 16 for sealed axial movement and is arranged so that sealed flow can occur from a part of the cavity of the body of the faucet that has a reduced section and in which one of the supply pipes 2 is connected. The seat 25 for the valve plate has some projections 30 which can interact in the passage apertures 32a to laterally affix the plate 32. The cartridge has an annular ring 34 which has some upper teeth 35 that engage with corresponding recesses 33 present peripherally on the work face of the fixed valve plate. In addition, the annular ring has lower teeth 36 which snap fittingly engage with the recesses 29 present on the separate part 25 of the cartridge.

26 Claims, 3 Drawing Sheets

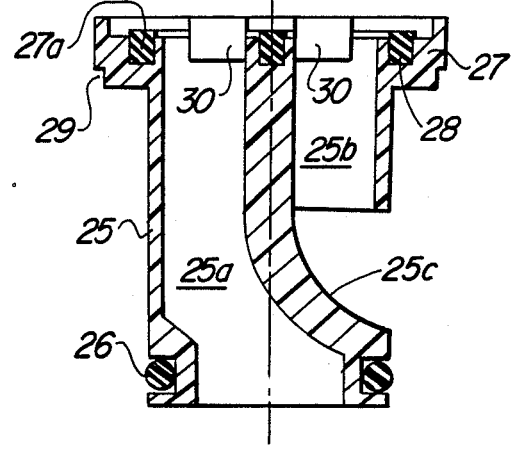
Fig-7
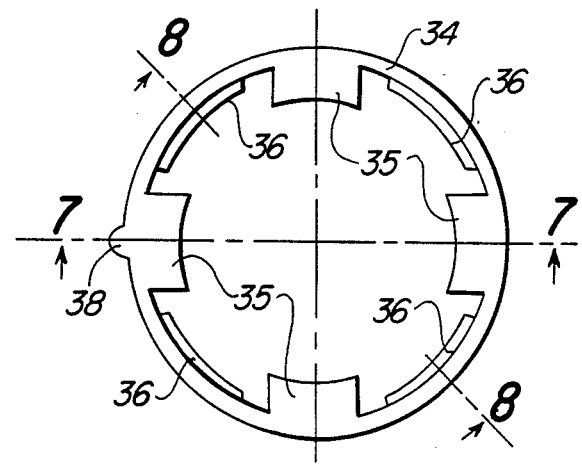
Fig-8
Fig-6
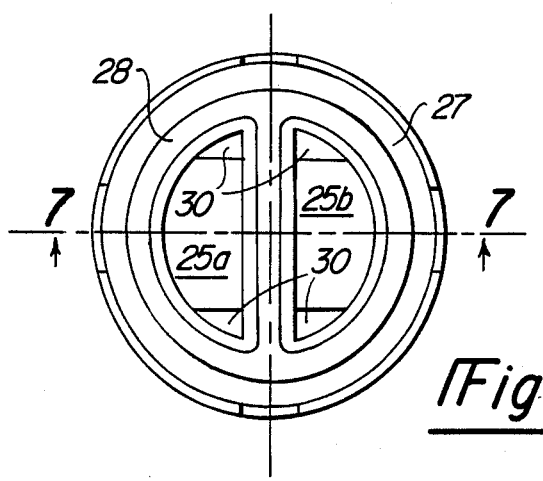
Fig-5

MIXING CARTRIDGE FAUCET WITH PARTS THAT CAN APPLY PRESSURE TO THE VALVE PLATES OF HARD MATERIAL

TECHNICAL FIELD

The present invention relates to a mixing faucet, especially for hot and cold water, of the type including a cartridge that houses at least one fixed valve plate and at least one movable valve plate movable against said fixed valve plate for controlling the proportion of mixing and the flow of water from the faucet.

BACKGROUND OF THE INVENTION

The construction of the faucets of the type considered requires that the cartridge has to function as a hydraulic piston does so that the correct amount of contact pressure can be applied between the fixed valve plate and the movable valve plate of the faucet. The cartridge section on which the water pressure is applied must be limited so that excessive contact pressure does not develop. Consequently, the body of the faucet has required expensive work operations of deep undercutting at the section that receives the cartridge to limit the area that is exposed to the inlet water pressure.

Secondly, there are difficulties in accurately placing the fixed valve plate in an operatively fixed part of the cartridge. The valve plates are often made through processes of sinterization of ceramic materials where it is not possible to assure the effective dimensions of the product unless there are great relative tolerances that are proportional to the same dimensions. The smallest tolerance that is practically achieved in the diameter of a valve plate of normal dimensions can typically amount to 0.6 mm. This tolerance must be taken into consideration when producing the seat which is constructed to receive a valve plate of this type. Due to the manufacturing tolerances, the seats are often oversized so that the valve plates are placed with enough clearance to create a certain amount of gap space. During the operation of the faucet, the fixed valve plate can undergo lateral motion allowed by the gap thereby wearing on the seal gaskets on which it sits, and on the other hand, rendering the designed geometry of the system to be imperfect. In other words, the flow and mix curves designed into the faucet are not followed exactly due to the mispositioning and motion of the fixed plate.

Further, in order to fix the fixed valve plate in its correct angular position, some deep slits must be made on its periphery. These slits must extend radially and engage with corresponding projections from the valve seat. Further, the presence of these deep slits weakens the valve plates that are, by their nature, fragile.

Furthermore, it is often desired to clamp the fixed valve plate and not simply place it on the seal gasket of the seat. The operation of clamping by means of a central screw makes the process of mounting relatively onerous, and further, it requires that there be a hole in the fixed valve plate. The presence of a hole weakens the fixed valve plate and intrudes into the area best reserved for the opening of the passage to have the most desired form.

What is needed is a mixing faucet construction of the type considered in such a way as to provide more accurate lateral and angular positioning of the fixed valve plate and a clamping mechanism for the fixed plate while controlling the compression pressure due to the hydraulic pressure acting on the cartridge.

SUMMARY OF THE INVENTION

According to one aspect of the invention, the faucet has a body and a cartridge therein that has a separate member that supports the fixed valve plate. The separate member is movably connected to the covering i.e. shell of the cartridge for axial movement relative thereto. The fixed part is also slidably connected to the body and maintains a seal therewith as it axially slides in a part of the cavity of the body of the faucet that has a reduced section that receives one of the water inlets.

The above mentioned operatively fixed part of the cartridge functions as a hydraulic piston to apply the pressure of contact between the fixed valve plate and the movable valve plate. The hydraulic pressure is generated only by pressure in a reduced section of the cavity in the body of the faucet. The pressure exerted by the water on the remaining part of the covering of the cartridge is not translated onto the fixed valve plate against the movable valve plate. The covering, i.e. shell however, can be sealingly inserted in a larger section of the cavity permitting simplification of the conformation and work which has to be done on the body of the faucet; in particular, reducing or avoiding the operation of undercutting for the supply ports leading into the cavity.

In another aspect of the invention, the seat in the operatively fixed part of the cartridge that receives the fixed valve plate has projections that axially intrude into the supply apertures of the fixed valve plate to abut the perimeters of the apertures to laterally and angularly fix the valve plate in the seat. In particular, the outer profile of these projections has a section which corresponds to the respective portions of the outline perimeter of the apertures in the fixed valve plates for the passage of hot and cold water.

The position of the fixed valve plate in its seat is defined by the arrangement between the outer profile of the projections and the perimeter of the apertures of the fixed valve plate The distance between the portions of the perimeter of the apertures are notably less than the diameter of the valve plate so that at equal conditions of processing, their relative positions present proportionally less manufacturing tolerance and are more particularly set. Consequently, the resulting gap space that must be foreseen for the insertion of the fixed plate is lessened and the associated disadvantages of the manufacturing tolerances are lessened. Further, there is no need to weaken the valve plate with special and deep positioning slits.

According to another aspect of the invention, the cartridge has an expandable annular ring which has upper and lower sections of engagement. The upper sections are preferably extending shoulders that engage with corresponding recesses on the periphery of the work face of the fixed valve plate. The lower sections are preferably snap teeth disposed to elastically release into recesses present on the operatively fixed member of the cartridge that seats the fixed valve plate.

The annular ring can fixedly secure the fixed valve plate in place, while maintaining compression on the sealing gaskets between the cartridge member and fixed valve plate by means of an action exercised at the peripheries and without disadvantageous limitations to conformation of the apertures thereof in the fixed valve plate. Further, the application by means of an elastic release of snap teeth provides for easy mounting of the fixed valve plate. The recesses required on the work surface of the valve plate are not deep and do not significantly weaken the valve plate.

BRIEF DESCRIPTION OF THE DRAWINGS

Reference now will be made to the accompanying drawings in which:

FIG. 5 is a top plan view of a cartridge section that seats the fixed valve plate;

FIG. 6 is a top plan view of the retaining ring shown in FIGS. 1 and 2;

FIG. 7 is an exploded and segmented view of the cartridge sections that seats the fixed valve plate, the fixed valve plate and the retaining ring, taken along lines VII—VII of FIGS. 5 and 6; and FIG. 8 is a sectional view of the retaining ring taken along line VIII—VIII of FIG. 6.

DESCRIPTION OF THE PREFERRED EMBODIMENT

Figure 1:
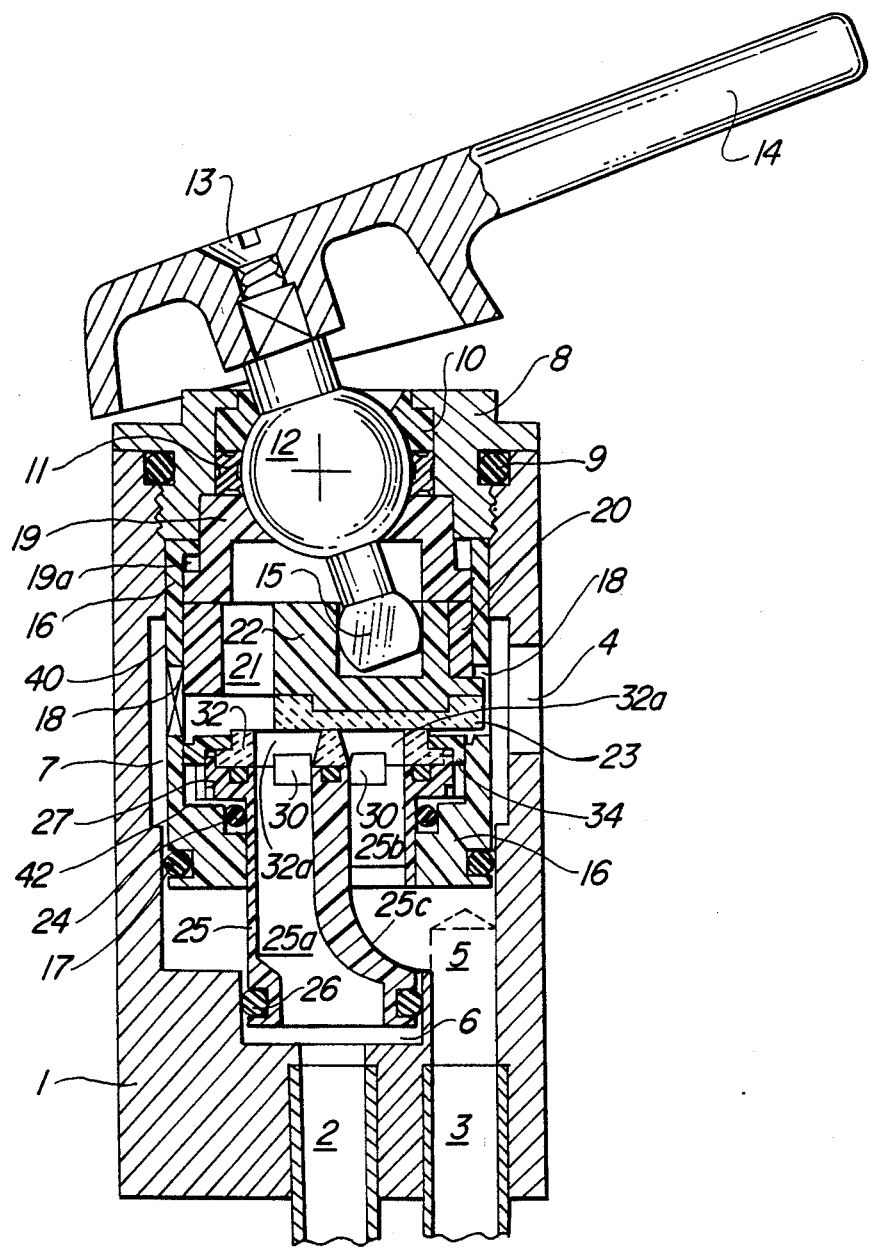
FIG. 1 is a segmented side elevational view of a mixing faucet according to one embodiment of the invention.

The mixing faucet according to FIG. 1 has a body 1 with a cavity 5 that receives two supply pipes 2 and 3 for the supply of hot and cold water or vice versa. The cavity also has an outlet 4 for the delivery of mixed water. The cavity 5 of the body 1 is constructed to receive the cartridge 40. The cavity 5 has a narrow diameter section 6 which receives the pipe 2 while the pipe 3 runs directly into the cavity 5 above section 6. Cavity 5 can have, as represented, an expansive part 7 formed by a light undercut aligned with the outlet. If desired, the undercut 7 can be eliminated with a slight increase in the diameter of the cavity extending to its threaded upper opening that is closed by a cap 8 which is screwed in and provided with a seal gasket 9. Upper half bearing 10 and gasket 11 are mounted in the cap 8. The bearing 10 and gasket 11 engage the control ball 12 to which, by means of a screw 13, is mounted to an operating lever 14. Moreover, a key 15 also depends from the control ball 12 to transmit the movement imparted by lever 14 to the operative parts of the cartridge, namely, guide ring 20, guide slide 22 and movable valve plate 23.

The cartridge 40 is inserted in cavity 5 of body 1. A circumferentially mounted gasket 17 seals the cartridge 40 with the body 1. The cartridge has a cover section 16, commonly referred to as a cage, provided with discharge opening 18 that communicate with outlet 4 in body 1. A lower half bearing 19 is mounted in cover section 16 preferably with axial gap space therebetween for reasons explained below. The lower half bearing 19 abuts the cap 8 and bears against the control ball 12.

A revolving guide ring 20 is mounted against the lower face of the half bearing 19. The ring 20 has a lateral slit 21 in which a slide 22 is guided. The key 15 is coupled to the slide 22. In turn, the slide 22 is coupled with a movable valve plate 23 of hard material. The parts that have been described up to this point do not differ from those parts of similar cartridges which are known in the art. The function of this above cartridge structure is also well known and will not be described further. On the other hand, the invention is not in any way limited to the cartridge whose structure correspond to this specific example.

Figure 2:
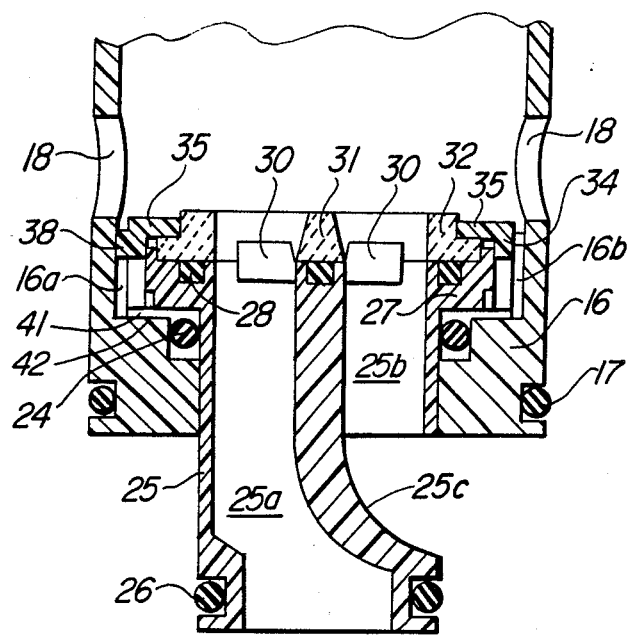
FIG. 2 is an enlarged fragmentary and segmented side elevational view of the cartridge element and cartridge cover shown in FIG. 1.
Figure 4:
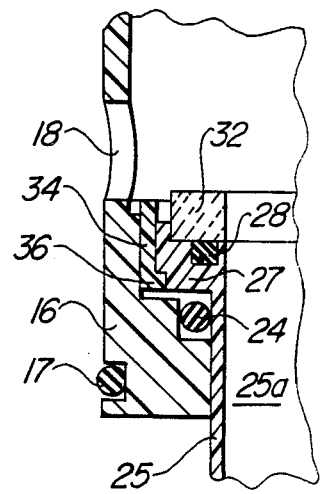
FIG. 4 is a fragmentary side elevational and cross-sectional view taken along line IV—IV of FIG. 3.
Figure 3:
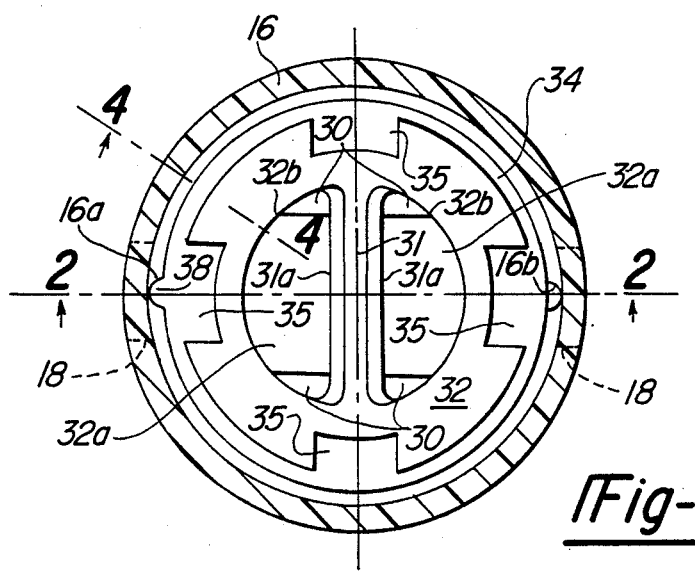
FIG. 3 is a top plan view of the components shown in FIG. 2.

At the bottom of the cover section 16 of the cartridge 40, a member 25 of the cartridge (FIGS. 5 and 7) is mounted to allow axial sliding with respect to section 16 and is sealed by means of a gasket 24 (FIGS. 1 and 2). The cartridge member 25 seats the fixed valve plate of hard material. The member 25 is dimensioned to slidably extend into the cavity section 6 of body 1 of the faucet and is sealed by means of circumferentially mounted gasket 26. The top end of cartridge section 25 has an enlarged diameter support head 27 constructed to receive a fixed valve plate 32 preferably made from a hard material such as ceramic.

The valve plate 32 in the form represented has an annular form with a cross bar 31 that defines two apertures 32a. The support head 27 has a hollowed out grooved section 27a for seating a sealing gasket 28 and has some projections 30 which extend into the apertures 32a of the fixed valve plate 32 and which are positioned to abut against the opposite edges 31a of the cross bar 31. Furthermore, the projections are located at the extremities of apertures 32a in order to abut the outer edges 32b of the apertures to define the position of the fixed valve plate 32 in relation to the support head 27. The member 25 of the cartridge 40 has two passages 25a and 25b. The first passage 25a runs to the lower extremity 6 below the interior of the gasket 26, while the second passage 25b runs laterally to the cavity 5 above the gasket 26, so that when the cartridge is mounted in the body of the faucet (FIG. 1), these passages allow communication between the supply pipes 2 and 3 and the apertures 32a of fixed valve plate 32. The member 25 of cartridge 40 can advantageously be constructed in plastic material.

In order to secure the valve plate 32 fixedly onto the support head 27, a ring 34 (FIGS. 6 and 8) is clamped onto the support head 27. The ring 34 has circumferentially spaced inwardly extending teeth 35 that engage an upper peripheral recessed shoulder 33. The ring 34 also has circumferentially spaced teeth 36 at its lower extremity that engage seat 29 which is a peripheral recessed shoulder in the support head 27. Further, the ring 34 has some vertical slits 37 which allow the teeth 36 to resiliently snap fit in place as they are flexed about head 27 during installation. For reasons of construction, the upper teeth 35 and lower teeth 36 are mutually alternating. Finally, the ring 34 has a lateral projection 38 adapted to cooperate with a corresponding groove 16a in the cover 16 of the cartridge (FIG. 2) in order that the position of the whole lower assembly, in particular member 25, plate 32 and ring 34 is angularly fixed in cover 16. The ring 34 can advantageously be made of a resilient plastic material.

Installation of cartridge assembly 4 is accurately and easily done. The valve plate 32 is mounted onto the support head 27 with the projections 30 received in the apertures 32a of the plate 32. The position of the fixed valve plate 32 can be defined with notable accuracy. This accuracy occurs because the distance between the projections 30 is much less than the diameter of the valve plate 32; and consequently, the relative tolerances of production of the outer diameter valve plate are not critical. The lateral movement of the plate 32 can thus be reduced or practically eliminated and also, in this way, one can benefit from the limited elastic deformations of the projections 30 where the projections are press fit into the apertures 32a. The ring 34 is then mounted upon the fixed valve plate 32 engaging the teeth 35 with the slits 33, and pushed against the head 27. In this operation, the gasket 28 of head 27 is compressed after which the teeth 36 spring elastically into the seat 29 of head 27 to fix the valve plate 32 and ring 34 to seat 29. The parts 25, 26, 27, 28, 32 and 34 can then be assembled onto the cartridge cover 16 as an assembled 32 and 34 single component. Because of this, the operations of mounting the cartridge are notably improved and are made more economical.

In mounting the cartridge cover 16 and member 25 in place the parts must be dimensioned to create an axial gap space 41 in cavity 5 of body 1 between the bottom shoulder 42 of the cover 16 of the cartridge and the support head 27 in order that the hydraulic pressure that acts on the cover 16 of the cartridge is not transmitted to the fixed valve plate 32. Plate 32 receives only a lesser amount of pressure provided by the member 25 of the cartridge from supply pipe 2. The pressure from supply pipe 3 acting on the surface 25c of member 25 slightly lessens the net upward hydraulic pressure acting on member 25.

Often the hot and cold water supplies are reversed. However, operation of the faucet needs to be in the same fashion whether supply pipe 2 or pipe 3 supplies the cold water and vice versa for the hot water. To accommodate the reversed supply pipes, a second recessed groove 16b in the cover 16 of the cartridge is made. This recessed groove 16b is diametrically opposite the groove 16a such that the assembly of member 25 can be mounted in two different positions, one rotated 180 degrees with respect to the other. A choice of the position of mounting the member 25 between the two possible positions, allows compensation for any inversion of the connection of supply pipes 2 and 3 to the conduits of hot and cold water.

The half bearing 19 is mounted with an axial gap space 19a in the cover 16 of the cartridge. The gap 19a is dimensioned long enough to make it possible when the cartridge 40 is outside the body to push the member 25 toward the interior of the covering 16 as much as is necessary to disengage the projection 38 from the groove 16a or 16b in which it is found. The member 25 can then be turned 180 degrees and re-engaged with the other groove 16b or 16a without disassembling the cartridge 40. When the cartridge is in body 1 and is functioning, the pressure of the water pushes the cover 16 in contact with the cover 8 against which the half bearing 19 lays so that there is not enough axial clearance for the projection 38 to free itself from either groove 16a or 16b in which it is seated, and thus an unintentional rotation of member 25 within cartridge cover 16 cannot take place.

The above described construction allows the repositioning of member 25 of cartridge assembly 40 without the need to take anything apart. The member 25 also functions as a piston and seats the fixed valve plate with respect to the cover 16 of the cartridge. Thus the inversion of hot and cold water is easily accommodated while maintaining correct operation of the faucet regardless of the way the connection of the body of the faucet to the supply pipes is made.

Although in general it is best that there are two positions that member 25 can assume, i.e. two positions 180 degrees apart, it must be understood that in particular cases, there can be more than two positions possible and/or the distances between the positions can have angles which are different from 180 degrees.

The projections 30 of the seat can have various structural shapes for different purposes. For example, if desired, the projections can be rounded or made in layers so that the flow of water is not impeded, or they can have special construction for the purpose of achieving preclosing in order to reduce the noisiness of particular functioning conditions of the faucet. Further, the projections can abut only limited sections of the periphery of one or more of the passage apertures or they can be so extensive that they cooperate with significant sections of each periphery or, maximally, they can cooperate with the entire periphery of one or more openings.

The described projections are particularly effective in the positioning of a fixed valve plate of the type illustrated having an annular, circular form, and including a crossbar that defines the two passage openings. However, one must understand that it has been found that these means of positioning can also be applied advantageously in relation to fixed valve plates that are annular but not circular or to valve plates of any other form that have apertures or recesses for the passage of water.

Furthermore, the described fixed valve plate and the annular ring are circular However, it must be understood that the ring can also secure a valve plate which is not circular In this case, the ring must have an inner periphery which corresponds to that of the fixed valve plate. The ring can have the groove and the cartridge cover can have the lateral projections that engage the groove to angularly fix the separate member of the cartridge. Alternatively, the outer periphery of the ring can be non-circular in shape and received in the cage having a corresponding inner shape. Other keyed arrangements can be between the ring and cage to prevent the ring from rotation with respect to the cage.

Variations and modifications of the present invention are possible without departing from the scope and spirit as defined in the appended claims.

I claim:

1. A cartridge for a mixing valve faucet that regulates the flow rate and mixing proportions of liquid from two supply inlets to said faucet, said cartridge characterized by:

a main shell;

an operating mechanism mounted to said shell;

a movable valve element operably connected to said operating mechanism;

a separate seat member mounted to said shell;

said separate seat member mounting a fixed valve plate to cooperate with said movable valve element;

said separate seat member being slidably and sealably connected to the shell of the cartridge;

sealing means interposed between said shell and said separate seat member for sealing fluid from flowing therebetween;

the separate seat member being constructed such that its lower extremity extends in a part of a cavity of the body of the faucet that has a reduced area in cross-section and in which one of the supply pipes is connected.

2. A mixing faucet according to claim 1 further characterized by:

the separate seat member of the cartridge that supports the fixed valve plate having an enlarged diameter upper end to form a support head for the fixed valve plate and when mounted to said shell provides an axially extending gap between said support head and a lower shoulder of said shell under said support head and within said shell.

3. A mixing faucet according to claim 1 further characterized by:
said separate seat member having two passages therethrough in communication with respective apertures in the fixed valve plate, one passage runs centrally to the lower end of the separate seat member, while the other passage extends laterally.

4. A mixing faucet according to claim 1 further characterized by:
the separate seat member of the cartridge that receives the fixed valve plate having projections that abut the periphery of the passage aperture through the fixed valve plate for the passage of hot and cold water to laterally affix the position of the fixed valve plate.

5. A mixing faucet according to claim 4 further characterized by said fixed valve plate having an annular form with a cross bar that separates two passage apertures; said projections of the operatively fixed part of the cartridge positioned against opposite edges of said cross bar and placed near extremities of said apertures.

6. A mixing faucet according to claim further characterized by:
an annular expandable retaining ring having upper and lower engaging portions, the upper portions being disposed to engage with corresponding recesses present peripherally on the work face of the fixed valve plate, and the lower portions being able to engage by snap fitting into recesses present on the separate seat member of the cartridge that supports the fixed valve plate.

7. A mixing faucet according to claim 6 further characterized by the separate seat member of the cartridge that supports the fixed valve plate having an enlarged diameter upper end to form a support head for the fixed valve plate and when mounted to said shell provides an axially extending gap between said support head and a lower shoulder of said shell under said support head and within said shell, said support head having a lower peripheral recess engaging said lower engaging portions of the ring of the fixed valve plate.

8. A mixing faucet according to claim 6 further characterized by said upper and lower engaging portions of the ring being circumferentially spaced and mutually alternating.

9. A mixing faucet according to claim 6 further characterized by said ring having circumferentially spaced vertical slits which open toward its lower part providing elasticity to the lower engaging portions.

10. A mixing faucet according to claim 6 further characterized by said ring having key means for preventing angular rotation of said ring with respect to said shell.

11. A mixing faucet according to claim 6 further characterized by a lateral projection extending from one of said annular ring and said cartridge shell and engaging a corresponding groove in the other of said ring and said shell of the cartridge to affix the angular position of the fixed valve plate.

12. A mixing faucet according to claim 11 further characterized by a second groove in the other of said ring and said shell and said separate seat member being axially slidable with said shell such that when the cartridge is not mounted in the body of the faucet, the separate member can be axially moved to disengage the projection from the groove without disassembly of the seat member from the shell and rotate with respect to the fixed valve plate and ring to another position and re-engage the projection with said second groove.

13. A mixing faucet according to claim 12 further characterized by said separate seat member of the cartridge adapted in such a way that an inversion of the connections of the supply pipes is caused by rotation of the separate seat member to said other position.

14. A mixing faucet according to claim further characterized by said shell of the cartridge, the separate seat member, and ring are made of plastic material.

15. A cartridge for a mixing valve faucet that regulates the flow rate and mixing proportions of liquid from two supply lines to said faucet, said cartridge characterized by:
a main shell;
an operating mechanism mounted to said shell;
a movable valve element operably connected to said operating mechanism;
a separate seat member mounted to said shell;
said separate seat member mounting a fixed valve plate to cooperate with said movable valve element;
said separate seat member having projections that abut the periphery of passage apertures through the fixed valve plate to laterally affix the position of the fixed valve plate.

16. A mixing faucet according to claim 15 further characterized by said fixed valve plate having an annular form with a cross bar that separates two passage apertures; said projections of the separate seat member of the cartridge positioned against opposite edges of said cross bar and placed near extremities of said apertures.

17. A mixing faucet according to claim 15 further characterized by:
an annular expandable ring having upper and lower engaging portions, the upper portions being disposed to engage with corresponding recesses present peripherally on the work face of the fixed valve plate, and the lower portions being able to engage by snap fitting into recesses present on the separate seat member of the cartridge that supports the fixed valve plate.

18. A mixing faucet according to claim 17 further characterized by said upper and lower engaging portions of the annular ring being circumferentially spaced and mutually alternating.

19. A mixing faucet according to claim 17 further characterized by said annular ring having circumferentially spaced vertical slits which open toward its lower part providing elasticity to the lower engaging portions.

20. A mixing faucet according to claim 17 further characterized by said ring having key means for preventing angular rotation of said ring with respect to said shell.

21. A mixing faucet according to claim 17 further characterized by a lateral projection extending from one of said annular ring and said cartridge shell and engaging a corresponding groove in the other of said ring and said shell of the cartridge to affix the angular position of the fixed valve plate.

22. A cartridge for a mixing valve faucet the regulates the flow rate and mixing proportions of liquid from two supply lines to said faucet, said cartridge characterize by:
- a main shell;
- an operating mechanism mounted to said shell;
- a movable valve element operably connected to said operating mechanism;
- a separate seat member mounted to said shell;
- said separate seat member mounting a fixed valve plate to cooperate with said movable valve element;
- an annular expandable ring which has upper and lower portions of engagement, the upper portions are disposed to engage with corresponding recesses which are present peripherally on the work face of the fixed valve plate, the lower portions engage by means of an elastic release with recesses present on the separate seat member which is constructed to support the fixed valve plate.

23. A mixing faucet according to claim 22 further characterized by said upper and lower engaging portions of the annular ring being circumferentially spaced and mutually alternating.

24. A mixing faucet according to claim 22 further characterized by said annular ring having circumferentially spaced vertical slits which open toward its lower part providing elasticity to the lower engaging portions.

25. A mixing faucet according to claim 22 further characterized by said ring having key means for preventing angular rotation of said ring with respect to said shell.

26. A mixing faucet according to claim 22 further characterized by a lateral projection extending from one of said annular ring and said cartridge shell and engaging a corresponding groove in the other of said ring and said shell of the cartridge to affix the angular position of the fixed valve plate.

* * * * *